United States Patent [19]

Lamusga

[11] Patent Number: 4,637,202
[45] Date of Patent: Jan. 20, 1987

[54] LAWN MOWER GRASS COLLECTOR BAG SUPPORT

[75] Inventor: Gary R. Lamusga, Prior Lake, Minn.

[73] Assignee: The Toro Company, Minneapolis, Minn.

[21] Appl. No.: 605,329

[22] Filed: Apr. 30, 1984

[51] Int. Cl.$^4$ ............................................. A01D 35/22
[52] U.S. Cl. ........................................ 56/16.6; 56/202
[58] Field of Search ................ 56/16.6, 202, 320.2; 248/95, 99, 100, 101

[56] References Cited

U.S. PATENT DOCUMENTS

| | | | |
|---|---|---|---|
| 3,579,966 | 5/1971 | Allina | 56/202 |
| 3,961,467 | 6/1976 | Carpenter | 56/202 |
| 3,974,631 | 8/1976 | Rhodes | 56/202 |
| 4,047,368 | 9/1977 | Peterson | 56/202 |
| 4,095,398 | 6/1978 | Aumann et al. | 56/202 |
| 4,310,998 | 1/1982 | Cuba | 56/202 |
| 4,532,755 | 8/1985 | Schemelin et al. | 56/202 |

*Primary Examiner*—Gene Mancene
*Assistant Examiner*—David I. Tarnoff
*Attorney, Agent, or Firm*—Joseph P. Martin

[57] ABSTRACT

A bag support for a riding lawn mower grass collector includes a rectangular framework (2) attached to a mower (10) with grass directing hood (4). A grass bag (6) has a resilient frame (8) extending substantially around bag opening (40). A much larger leaf bag (80) has a resilient frame (82) extending substantially around bag opening (40'). Frames (8, 82) include three continuous coplanar sides and a fourth side with a central open space (44, 86) bounded by a pair of handles (12, 12') extending perpendicularly outward from frame (8, 82). The sections of the fourth side adjacent open space (44, 82) are at an acute angle to the plane of the three coplanar sides. Frames (8, 82) are configured to match separate portions of framework (2). Framework (2) includes transverse brackets (14) and (16) at locations to correspond with alternate sizes of bag (6) or (80). Handle retaining brackets (18) are attached to rear of framework (2) to receive handles (12, 12'). Brackets (18), resilient frame (8, 82), brackets (14) or (16) and angled segments (45, 87) of the fourth side of frames (8, 82) cooperate to provide a sealing engagement between framework (2) and matching frames (8, 82). Framework (2) can thus support a plurality of small bags (6) or a single larger bag (80) by utilizing brackets (14) or (16), respectively.

14 Claims, 12 Drawing Figures

LAWN MOWER GRASS COLLECTOR BAG SUPPORT

TECHNICAL FIELD

This invention relates primarily to a simplified grass collecting system for a riding lawn mower which eliminates much of the structure and resultant cost heretofore required. More particularly, this invention relates to a common means for supporting a plurality of small bags, or one large bag on a riding lawn mower, for collecting grass clippings, leaves and the like, whereby the bags can be easily removed from the collector for disposition of the contents. A resilient bag frame imposes a biasing force against the support framework to provide a seal between bag and framework as well as retaining the bag to the framework. The grass bags are sized to accept standard disposable plastic yard bags so grass can be deposited directly into the disposable bags. An available leaf bag is much larger than the grass bags to minimize stops to empty the bag when vacuuming up leaves.

DESCRIPTION OF THE PRIOR ART

Grass collecting systems for lawn mowers are well known. Most common are porous fabric bags attached to the mower housing. The bag may be mounted at the side of the mower in the configuration usually called a side bagger, or as is most common on riding mowers, at the rear of the housing. The present invention relates to a rear bagger.

A grass collecting system for a riding lawn mower has heretofore required a relatively substantial structure, since the bags are quite large and heavy when filled, particularly when filled with damp, lush grass. U.S. Pat. No. 4,015,406 to The Toro Company, assignee of the present invention is illustrative of a grass collector known as the Easy-Empty ®. It consists of a full width grass directing hood and a hard plastic hinged clamshell-type receptacle which is dumped by manipulating a lever which pivots the clamshell cover upward and allows the contents to fall out on the ground. This device is quite expensive and does not contemplate disposable bags for the clippings, or disposition other than dumping the clippings on the ground. This type of collector necessitates either a large unused area for repeated dumping of clippings, or the additional operation of collecting the clippings into other containers for removal. This is laborious and time-consuming.

Another grass collector known as the Easy Fill marketed by The Toro Company also embodies a full width grass directing hood and supporting structure. A framework is hingedly attached to the hood structure. The framework includes a floor, side bars, and a top frame to which disposable plastic bags are attached with retainer cords. The bags rest on the floor. The rear of the hinged framework is lowered by releasing a latch and pivoting the framework downwardly until it rests on the ground. The filled bags can then be removed. This system is relatively expensive because of the extensive framework and floor required, and because of the weight of the assembly, may necessitate the use of counterbalance weights at the front of the riding mower.

U.S. Pat. No. 4,158,272 discloses another grass collecting system which is basically a covered trailing cart for the clippings. This system is cumbersome, expensive, and does not provide for the disposal of clippings other than merely dumping them on the ground.

SUMMARY OF THE INVENTION

Therefore, it is an object of this invention to provide a lightweight, inexpensive, practical means for supporting a bag or bags for collecting grass clippings. This invention provides means for depositing clippings into two reusable bags which can easily be removed from the mower without tools, and without manipulating a cumbersome framework or hopper, and emptied into disposable bags or other methods of disposing of the clippings. A resilient bag frame imposes a biasing force to hold the bag in place in a sealing relationship with the support framework.

Another aspect of this invention is to provide the reusable bags in a size such that a standard 30 gallon disposable plastic bag may be inserted therein, the disposable bags held in place by the snug fit of the resilient frame of the reusable bags against the tubular framework, without the need for retainer cords or the like. Retainer cords are subject to loss or breakage and often come loose, which is annoying as the grass clippings can spill onto the ground. Thus, in the present invention, clippings can be deposited directly into the disposable bags. The filled disposable bags can then be removed from the reusable bags and disposed of in a conventional manner.

Another aspect of this invention is to provide a common framework that can be used to support a plurality of small grass bags, or alternatively, one large leaf bag for collecting leaves or the like. Use of the large bag minimizes the frequency of stops required to empty the bag.

BRIEF DESCRIPTION OF THE DRAWINGS

The present invention will be described hereafter in the Detailed Description, taken in conjunction with the following drawings in which like reference numerals refer to like elements throughout.

DETAILED DESCRIPTION

Figure 1:
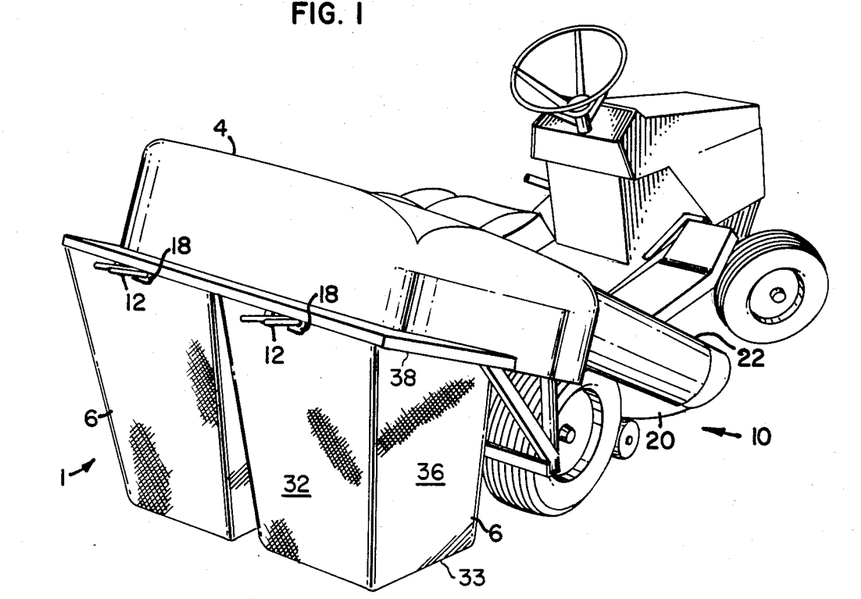
FIG. 1 is a right rear perspective view of a bag support of this invention with a grass collector mounted on a riding mower, particularly illustrating two grass bags for receiving clippings.

An improved bag support for a riding mower grass collector according to this invention is generally identified as 1. A grass directing hood 4 is attached to a framework 2 which is also the means for mounting the collector to mower 10. Framework 2 will be described later. Mower 10 may be powered by an internal combustion engine or other means. The powering means drives a cutting element (not shown) which is enclosed within a housing 20. The cutting element may be a conventional rigid blade or a monofilament for severing the grass. A flow of air is required for proper cutting as well as for transport of the clippings into the bag. The air flow also provides a vacuuming action which is used advantageously to vacuum up leaves and the like. Typically, a rigid blade is equipped with an integral sail to generate air flow, while an auxiliary sail or fan may be used with a monofilament mower. In any case, the air flow generated conveys the clippings or leaves from within housing 20, up a chute 22 from whence they are directed into bags 6, normally filling from left to right.

Hood 4 is provided with various means for exhausting the generated air flow. In the present embodiment, a screen 24 within hood 4 prevents grass from escaping, but allows the air to escape forwardly of the bags. However, this is not claimed as a feature of the present invention.

Hood 4 supported on framework 2 is inclined upwardly from front to rear, corresponding generally to the angle of chute 22, so there are a minimum of restrictions to the flow of entrained clippings from chute 22 into the bags 6.

This invention relates specifically to an inexpensive means for supporting a plurality of grass bags 6 on a grass collector, or alternately a larger leaf bag 80, when the unit is used to vacuum up leaves. The invention also provides an easy and inexpensive means for removing and installing the bags. The bags are typically a loosely woven polyester, conforming to applicable governmental specifications, strong enough to contain sharp materials such as nails, pieces of wire, glass, etc. that may be picked up and thrown by the cutting element. Grass bag 6 may be of any size or shape compatible with the collector hood 4 and frame 2, but a generally square bag, large enough to hold a standard 30 gallon disposable plastic bag is preferred. Leaf bag 80 will be described later.

Reusable bag 6 has a front 30 and rear 32, a bottom 33, two sides 36 and an open top 40. Bag 6 is constructed with front 30 shorter than the rear 32 and the top edge of sides 36 sloping upwardly to the rear as at 38 at approximately the same angle to the horizontal as the inclination of hood 4, so that when the bag is in operative position, opening 40 will be parallel to inclined hood 4, and bag 6 will hang vertically from framework 2. See FIG. 1.

Figures 11, 12:
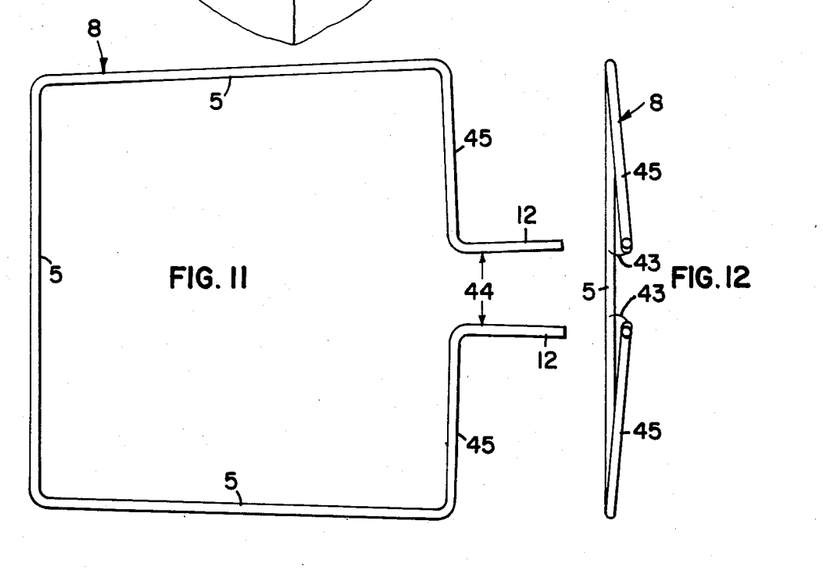
FIG. 11 is a top plan view of the resilient frame of FIG. 4 showing three coplanar sides and the handle spacing.
FIG. 12 is a rear plan view of the frame of FIG. 11, particularly showing the angled segments of the fourth side.

A bag frame 8 has three continuous and coplanar sides 5. The fourth side has an open space 44 at the center, bounded by a pair of parallel handles 12 extending perpendicularly outward from segments 45 of the fourth side adjacent open space 44. Segments 45 of the fourth side are at an angle of approximately three degrees from the plane of the remaining three coplanar sides 5 as best shown at 43 in FIG. 12. The purpose of the three degree inclination will be explained later.

Handles 12 are spaced so they can be grasped with one hand by an operator. Frame 8 is of a slightly resilient material, preferably a steel rod, such that handles 12 can be squeezed together without undue effort, and will return to their normal position when released. Bag frame 8 is formed and sized so that when two bags 6 are installed side by side on framework 2 as shown in FIG. 1, frames 8 will fit snugly against each other and a portion of framework 2 so clippings will fall into the bags and will not leak out around the bags and onto the ground.

Bag 6 is preferably attached to frame 8 by folding a portion of the bag material over frame 8 and the material sewn to secure frame 8 within fold 7. Bag 6 is positioned on frame 8 so handles 12 are at the center of the long rear segment 32 of bag 6. This orientation provides that handles 12 will be accessible at the rear of the unit and that bag 6 will hang vertically when installed. The short portion 41 of bag 6 between handles 12 is unsupported.

Figure 2:
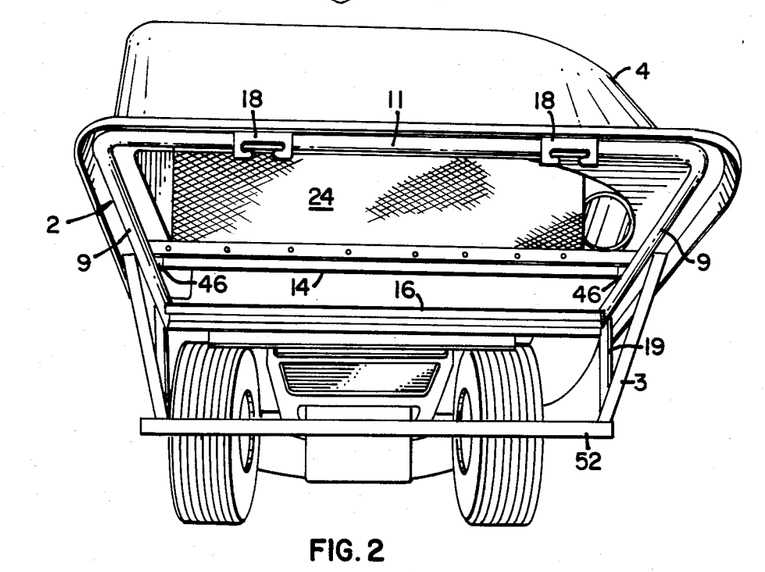
FIG. 2 is a rear elevational view of the invention of FIG. 1 with the bags removed, particularly illustrating the bag frame retaining bracket and the first and second brackets which support the front of the small and large bags respectively.
Figures 3, 4:
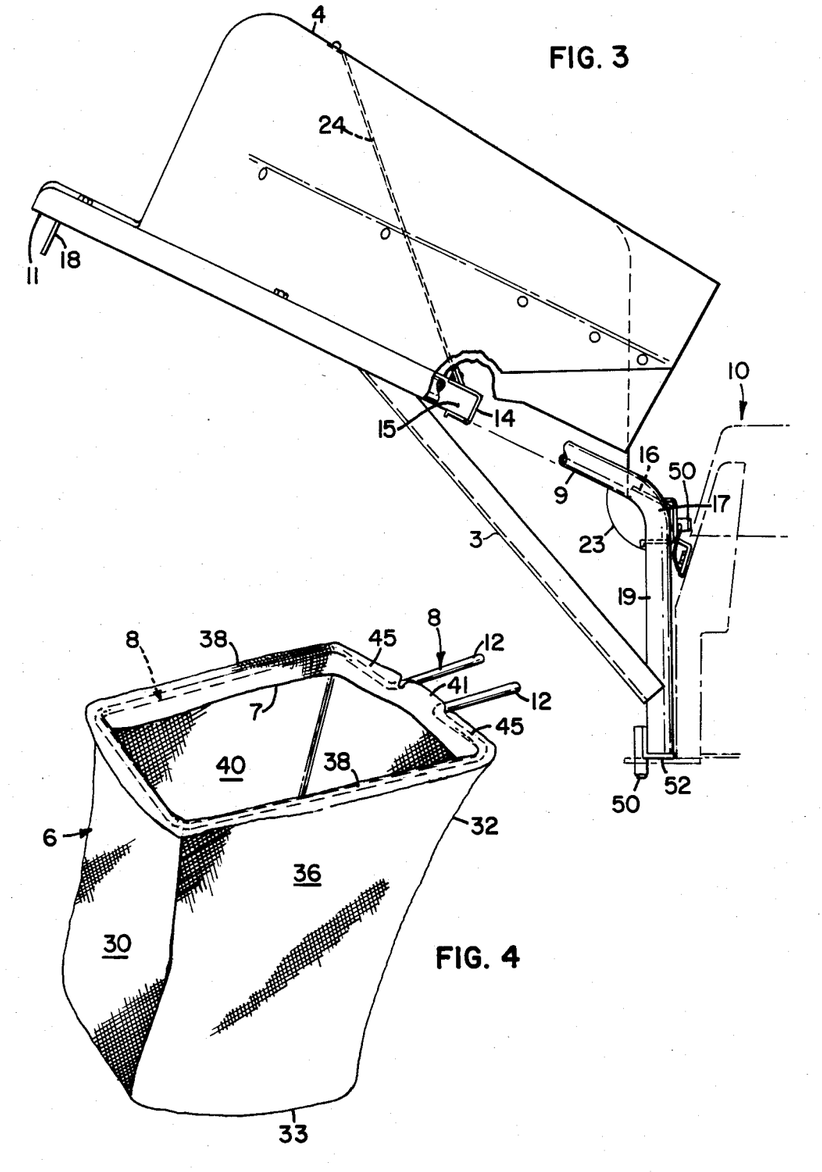
FIG. 3 is a side elevational view of the brackets of FIG. 2 with a portion of the hood and tubular framework broken away.
FIG. 4 is a perspective view of a bag of FIG. 1 with the dotted line showing the resilient frame, with integral handles, three coplanar sides, and an open space between the handles.

A single tubular member is formed into a U-shaped configuration, and a front end piece 52 is welded or otherwise attached across the open end to form a rectangular framework 2 when viewed in top plan. Front end 52 will be toward front of mower 10 when framework 2 is installed, with end 11 to the rear. Long sides 9 are bent at an obtuse angle 23 as best shown in FIG. 3. The location of the bend is determined primarily by the front to rear dimension of leaf bag frame 82 as will be described later. The downwardly bent portion 19 provides means for mounting the entire collector assembly 1 to mower 10. The remainder of framework 2 then extends rearwardly and upwardly at an angle approximating that of chute 22. This is best shown in FIGS. 1 and 2. The downwardly bent portion 19 is generally perpendicular to the ground when installed on mower 10. At least two transverse support brackets 14 and 16 are attached to framework 2 at specific points to be discussed later and provide structural reinforcement to framework 2 as well as additional uses to be described below. Diagonal braces 3 spanning obtuse angle 23 add strength to framework 2. Grass directing hood 4 is attached to the top of framework 2.

A first bag frame support bracket 14 is attached to tubular framework 2 transverse to the direction of travel and is coplanar with framework 2, at a point forward of end 11 a distance substantially equal to the front-to-rear dimension of bag frame 8. The location of bracket 14 as well as the shape of bag frame 8 ensures that bag 6 will fit snugly against tubular framework 2 to prevent grass spillage. In addition to acting as a grass bag support, bracket 14 gives structural support to framework 2. This dual usage minimizes the structural elements required, thus contributing to a lower total weight and price of the assembly. Bracket 14 is generally U-shaped, with open side 15 facing the rear for receiving bag frame 8. Open side 15 is wider than the cross sectional dimension of frame 8 so frame 8 can fit easily into opening 15 with bag 6 installed on frame 8. Bracket 14 has a notched out portion 46 at each end as shown in FIG. 2 for a purpose to be described later.

Second bag frame bracket 16 is located transversely across frame 2 forward of rear end 11 at a point equal to the front-to-rear dimension of leaf bag frame 82 and in alignment with long sides 9 of framework 2. In the preferred embodiment of this invention, bracket 16 is located at or very near the downward bend of framework 2. This is best shown in FIGS. 1 and 2. Second bracket 16 is also U-shaped, with the opening 17 to the rear. Opening 17 is wider than the cross-sectional dimension of leaf bag frame 82 so that frame 82 can fit easily into opening 17 with bag 80 installed on frame 82. Bracket 16 is also a structural support for framework 2. Mounting pins 50 on front end piece 52 and second bracket 16 fit through corresponding holes on mower 10, and are secured by hairpin cotters or the like. Thus, bracket 16 and front crosspiece 52 act as structural reinforcements as well as means for mounting the assembly to the mower. In addition, bracket 16 is the retainer for the front of leaf bag 82. These multiple functions further contribute to a lightweight, inexpensive unit.

Figure 5:
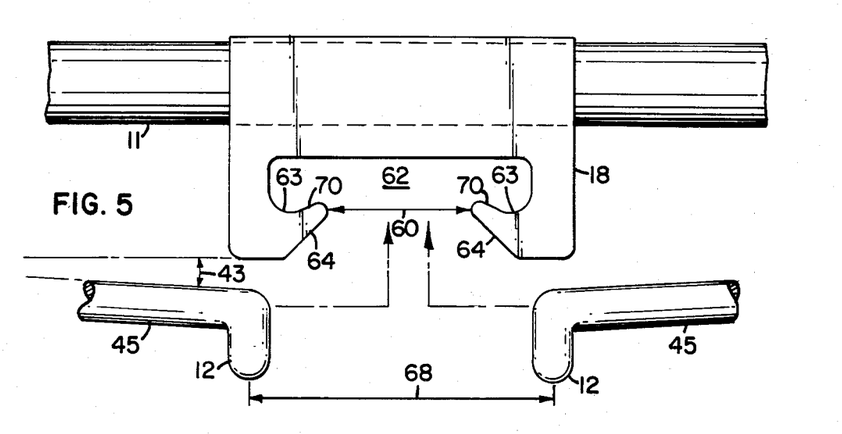
FIG. 5 is a rear elevational view on a different scale of the bag frame retaining bracket of FIG. 2 and the angled segments of the fourth side of the frame in their normal positions.

A pair of handle brackets 18 is attached to end 11. Handle brackets 18 are located on end 11 in a position to receive handles 12 or 12' when bags 6 or 80 are installed. Each bracket 18 is mounted perpendicularly downward from end 11 and includes a narrow opening 60 leading into a slot 62, the slot perpendicular to opening 60. The portions of bracket 64 adjacent opening 60 are slanted inwardly toward the opening 60 as best shown in FIG. 5. Opening 60 is wider than the width of handles 12 when they are squeezed together as shown at 66 in FIG. 6. Slot 62 is narrower than the width of handles 12 in their normal position shown at 68 in FIG. 5. The lower outside corners of slot 62 have a radius 63 large enough to accept bag frame 8. The portions of bracket 18 inside slot 62 adjacent both sides of opening 60 are slanted upwardly as at 70 toward opening 60 for a purpose to be described later.

Figure 8:
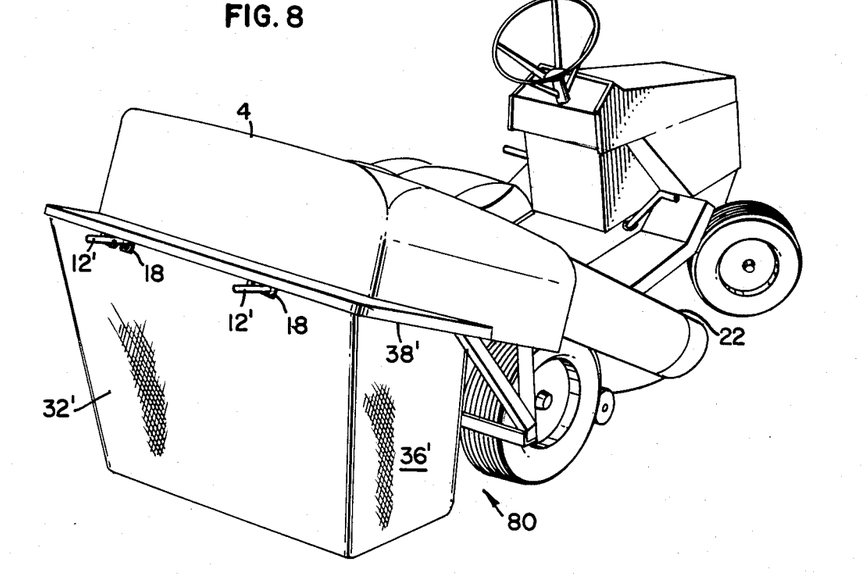
FIG. 8 is a right rear perspective view of the invention of FIG. 1 with one large leaf bag installed instead of two grass bags.
Figure 9:
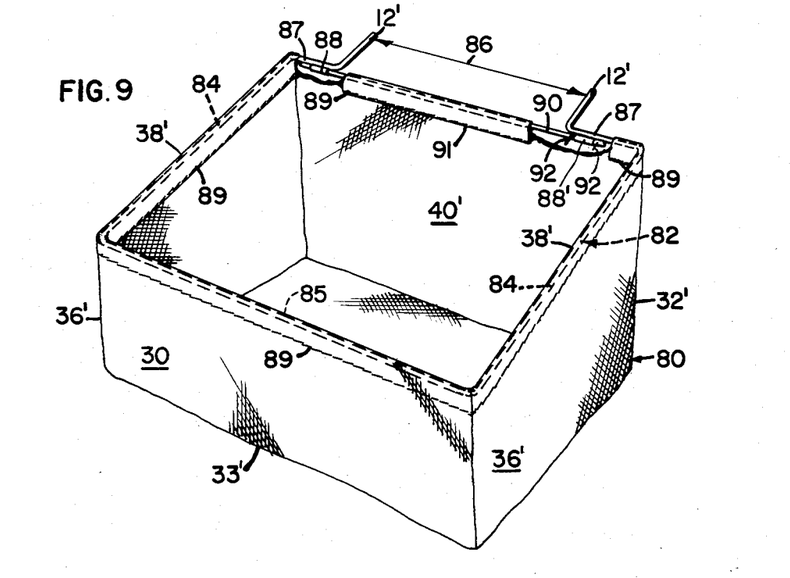
FIG. 9 is a perspective view of the leaf bag of FIG. 8 with portions of the bag broken away showing the bag frame and rod.

In the present embodiment of this invention, each of the two bag frame brackets 18 accommodate the pair of handles 12 of two grass bags 6 when bags 6 are installed side-by-side as shown in FIG. 1, or each bracket accepts one handle 12' of leaf bag 80 as shown in FIG. 8.

Figure 6:
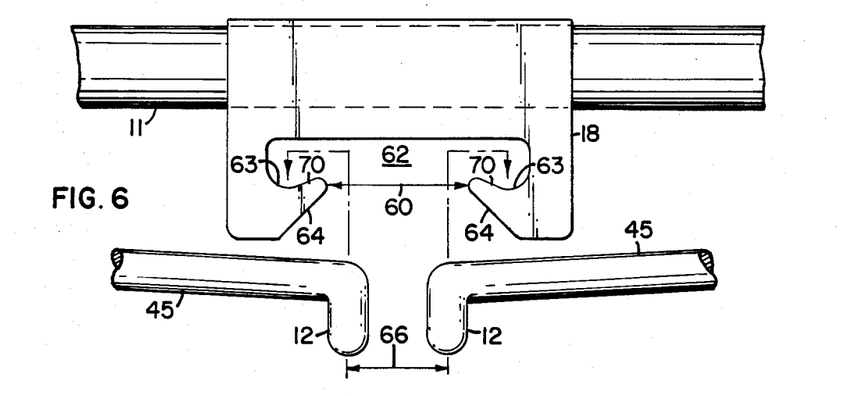
FIG. 6 is a rear elevational view of the bracket of FIG. 2 showing the handles squeezed together in position to be inserted into the bracket.
Figure 7:
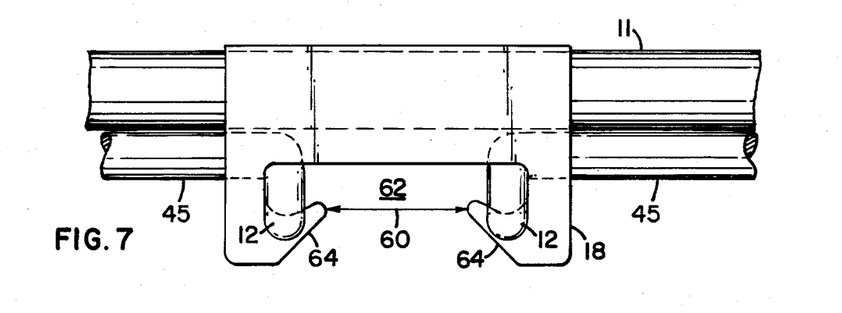
FIG. 7 is a rear elevational view of the bracket of FIG. 2 showing the handles secured in the bracket and the angled segments of the fourth side in coplanar alignment with the other three sides.

To install grass bags 6, the portion of bag frame 8 opposite handle 12 is inserted into open side 15 of first bag support bracket 14, bag 6 pivoted upwardly and handles 12 squeezed together as at 66 in FIG. 6. Handles 12 are then inserted into opening 60, being guided by the slanted portions 64. When handles 12 are in slot 62, they are released as shown in FIG. 7. The resilience of frame 8 holds handles 12 in slot 62 since slot 62 is narrower than the normal spacing 68 of the handles. Radius 63 and upward slopes 70 as well as the biasing force of bag frame 8 help nestle handles in place in slot 62 for a positive securement. As mentioned previously, bag frame 8 is configured to fit snugly against framework 2 so clippings will be deposited directly into the bags and not onto the ground.

The three degree inclination 43 of segments 45 of frame 8 adjacent handles 12 requires that segments 45 must be biased against the resilience of frame 8 into coplanar alignment with the three coplanar sides, in order to allow handles 12 to be inserted into the slot 62 of bracket 18. In effect, the edges of slot 62 act as a fulcrum, which transmits the biasing force against framework 2 when handles 12 are secured in bracket 18. This is best illustrated in FIGS. 5, 6 and 7. This biasing action contributes substantially to a sealing fit of frame 8 against framework 2.

Figure 10:
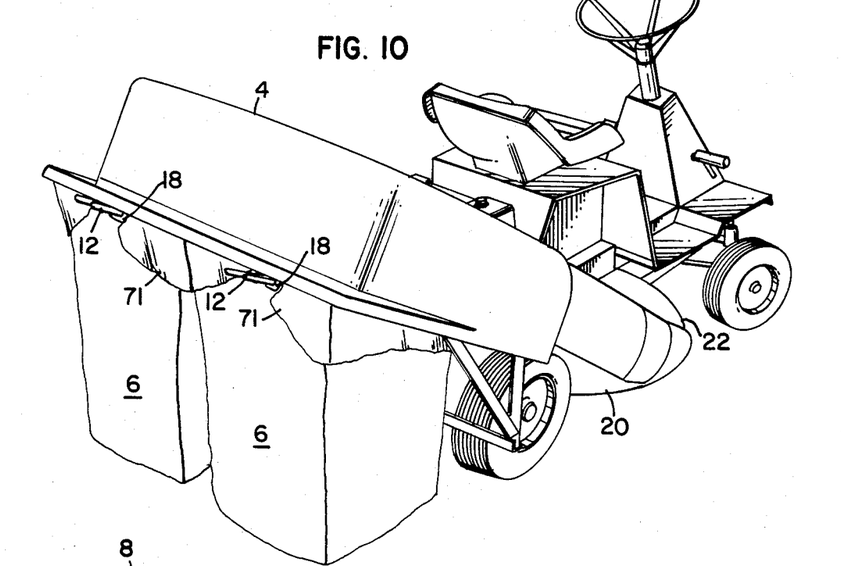
FIG. 10 is a perspective view of the invention of FIG. 1 with disposable plastic bags inserted in the reusable bags.

A desirable feature of this invention is that a disposable plastic bag 71 can be inserted into reusable fabric grass bag 6 as shown in FIG. 10, and retained without retainer cords or other fasteners. The top edge of plastic bag 71 can be merely folded over bag frame 8. The snug fit of bag frame 8 to tubular framework 2 holds plastic bag 71 in place. When filled, plastic bag 71 can easily be removed from the regular bag, and disposed of in a conventional manner.

When inserting plastic bag 71 into reusable bag 6, handles 12 may be inserted into brackets 18 from the front so bag 6 will be supported rearwardly from framework 2 to facilitate inserting plastic bag 71. When plastic bag 71 is inserted, bag 6 is to be returned to its operative position.

The bag support structure of this invention has an additional significant advantage. A single large leaf bag 80 as illustrated in FIG. 8 can be installed to tubular framework 2 in place of smaller grass bag 6. Leaf bag 80 would normally be used for a specialized function, such as vacuuming up leaves or the like. Leaf bag 80 is constructed in much the same manner as grass bag 6. Leaf bag 80 consists of a front side 30', a rear side 32' longer than front side 30', a bottom 33', two sides 36' and an open top 40'. Sides 36' are cut with the top edge 38' sloping upwardly from front to rear at the same angle to the horizontal as framework 2, so that when leaf bag 80 is installed, it will hang vertically.

Bag frame 82 consists of two sides 84 and front end 85 of frame 82 which are continuous and coplanar, while the rear end has an open space 86 at the center. Space 86 is bounded by a pair of handles 12' extending perpendicularly outward from said frame. Segments 87 of rear side adjacent space 86 are inclined at an angle approximately three degrees from the plane of sides 84 and front end 85 (similar to the angle shown at 43 in FIG. 12) for a purpose to be explained later.

Bag frame 82 thus extends around the top edge of sides 36', front 30', and a portion of rear side 32' leaving space 86 between handles 12'. Frame 82 conforms to the area of framework 2 bounded by sides 9, rear end 11, and second bracket 16. This conformation will ensure that leaf bag will, in effect, create a seal with framework 2 when installed, so that leaves will not leak out onto the ground. Frame 82 includes tubular members 88 and 88' adjacent each handle to receive rod 90 which extends across space 86 between handles 12'. Rod 90 is inserted through tubular members 88 and 88' to support the portion of bag 80 that extends across space 86, preferably by means of a hem 91 through which rod 90 may be inserted. Rod 90 extends beyond tubular member 88 an amount greater than the width of slot 62 in bracket 18. Rod 90 is secured to tubular member 88' by roll pins 92 or other means of securement. Rod 90 is thus free to slide in unsecured tubular member 88, so that handles 12' can be biased toward each other so they may be inserted into bag frame brackets 18. As stated previously, handles 12' are spaced wider than the outside ends of slot 62 so the resilience of frame 82 will hold handles 12' firmly in slot 62, in the pocket formed by radius 63 and inclined portions 70.

Bag 80 is affixed to frame 82 by folding a portion of the material of bag 80 around frame 82 at the periphery of opening 40', and sewing a hem 89 to secure bag 80 to frame 82. Another hem 91 encloses rod 90 so bag 80 is supported around its entire open end 40'. Bag 80 is positioned on frame 82 so handles 12' will be located at long rear side 32' of bag so bag will hang vertically when installed. Frame 82 is dimensioned so handles 12' will be located to engage in existing bag frame brackets 18. Handle spacing 86 is slightly wider than the horizontal distance between the outer edges of the pair of brackets 18. Wider spacing 86 is required so the resilience of frame 82 can be utilized to hold handles 12' in brackets 18.

Leaf bag 80 is installed by placing the portion of bag frame 82 opposite handles 12' into opening 17 of second support bracket 16, with bag 80 centered so handles 12' are aligned with bag frame brackets 18, then pivoting bag 80 upwardly and biasing handles 12' toward each other so they can be inserted through opening 60 and into slot 62, one handle 12' into each bracket 18. Notches 46 in first support bracket 14 are located to allow sides of bag frame 82 to pass therethrough when leaf bag 80 is installed, so that frame 82 will fit snugly against framework 2 so leaves will be deposited in bag 80 and not on the ground. Radius 63 and upwardly sloped portion 70 of bracket 18 cooperate with the outward biasing action of resilient bag frame 82 to hold handles 12' firmly in place on bracket 18. Inclined segments 87 of fourth frame side are forced into coplanar alignment with the sides 84 and front 85 when handles 12' are placed in bracket 18. The resilience of frame 82 applies a biasing force on handles 12' in slot 62, the edge of slot 62 acting as a fulcrum whereby said force is transferred into an upward biasing force to seal frame 82 against framework 2. Bag 80 is thus supported in a position to receive leaves or the like. To remove the bag, merely move handles 12' toward each other and remove them through opening 60 and withdraw frame 82 from bracket 16. The leaves may then be disposed of in a conventional manner.

While a preferred embodiment of the present invention has been described, various modifications and alternatives will be apparent to those skilled in the art after reading the foregoing description. For example, the bags and the corresponding portions of the frame and framework may be of any corresponding shape and size. Thus, it can be seen that changes may be contemplated without departing from the spirit and scope of the appended claims.

I claim:

1. A bag support for a vertically disposed grass collector bag on a lawn mower, comprising:
   (a) a support framework consisting of two sides and a front and rear end, said front end adapted for mounting to the mower;
   (b) a resilient frame having four sides, three sides being continuous and co-planar, the fourth side having a central open space defined between two segments of said fourth side adjacent said space being inclined at an acute angle to the plane of said three co-planar sides, said space bounded by a pair of handles extending perpendicularly outward from said segments;
   (c) said bag attached to said frame, said frame defining an open end of said bag;
   (d) a frame retaining bracket mounted on said front end of said framework for removably receiving a portion of said resilient frame opposite said handle; and
   (e) a handle retaining bracket attached to said rear end of said framework for removably receiving said handles, said bracket located so that said angled segments must be biased into planar alignment with said three co-planar sides of said frame to insert said handles into said bracket, whereby said frame bracket and handle bracket cooperate with the resilience of said frame and the bias of said frame segments to retain said bag in a substantially sealed grass receiving posture against said framework.

2. The invention of claim 1 wherein said handles are spaced such that both handles can be grasped by one hand of an operator.

3. The invention of claim 1 wherein said frame bracket is generally U-shaped in cross section, with the open side facing the rear, said open side wider than the cross sectional dimension of said frame.

4. The invention of claim 1, wherein the resilience of said frame is such that said handles can be squeezed together without undue force by an operator, and will return to their original position when released.

5. The invention of claim 1, wherein said handle bracket has a narrow opening leading into a slot perpendicular to said opening, said opening wide enough to accept the squeezed-together handles, said slot wider than said opening but narrower than the normal spacing of said handles, whereby said handles can enter said opening when squeezed together and are retained in said slot by the resilience of said frame when released.

6. The invention of claim 5, wherein said handles are integral with said frame.

7. The invention of claim 1, wherein two frames placed side-by-side match the conformation of the portion of said framework rearward of said frame bracket.

8. The invention of claim 7, wherein each said bag is of a size to accept a standard 30-gallon disposable plastic bag.

9. A support for vertically disposed grass and leaf collecting bags for a lawn mower, comprising:
   (a) a tubular framework substantially in rectangular form in top plan view, including long sides and a front and rear end, the front end adapted for attaching said support to said mower, said framework further including first and second transverse U-shaped frame retaining brackets mounted to said framework with said second bracket forward of said first bracket, the open portion of said brackets facing rearwardly, said first frame bracket notched at each end;
   (b) a first resilient frame substantially in the form of a square, three sides continuous and coplanar, the fourth side having a central opening defined between two segments of said fourth side adjacent said opening, said opening bounded by a pair of handles extending perpendicularly outward from said fourth side, the segments of said fourth side adjacent said opening being inclined at an acute angle to the plane of said three coplanar sides, the size of said resilient frame being such that two frames placed side by side encompass the area of said tubular framework rearward of said first bracket;
   (c) a second resilient frame, rectangular in top plan view, one long side and two coplanar end sides, a second long side having a central opening defined between two segments of said second long side adjacent said opening, said central opening bounded by two handles extending perpendicularly outward from said second long side, the segments of said second long side adjacent said opening at an acute angle to said coplanar side and ends, said second frame encompassing the area of said tubular framework rearward of said second bracket;

(d) a pair of horizontally slotted brackets mounted to said rear end and located for receiving said handles, said slots narrower than the normal spacing of said handles of said first frame and slightly below the plane of said tubular framework, whereby said angled segments of said fourth side or said second long side must be biased into coplanar alignment with said coplanar three sides to enable inserting said handles in said slot of brackets, whereby said slotted brackets cooperate with said first or second retaining bracket and the resilience of said first or second frame to retain said handles in each said slot, and whereby said biasing force is translated into an upward force holding each said frame snugly in a sealing engagement with said tubular framework; and (e) a bag attached to and depending from each resilient frame whereby either two of said first frames with bags may be installed utilizing said first bracket, or alternatively one second frame with bag may be installed utilizing said second bracket.

10. The invention of claim 9 wherein an auxiliary rod slideably attached to said second frame spans the space between said handles to support the portion of said second bag between said handles.

11. The invention of claim 9, wherein each of said first and second frames are integral with said handles.

12. An improved lawn mower of the type having a mower body that includes a housing in which grass is cut, a chute having one end connected to the housing for conveying grass clippings away from the housing, the chute having its other end connected to a grass directing hood mounted on the mower body, and bag support means for supporting at least one grass bag beneath the hood for receiving grass clippings therefrom, wherein the improvement relates to the bag support means and comprises:

(a) a bag frame from which the grass bag is suspended with the bag frame having an open, cross-sectional area that defines an open upper end of the grass bag, wherein the bag frame is resilient and includes means for selectively contracting the cross-sectional area thereof from a first normal sized area to a second smaller sized area; and (b) framework means for supporting the bag frame beneath the hood when the bag frame has its normal sized cross-sectional area and for releasing the bag frame for removal and dumping of the bag when the bag frame has its smaller sized cross-sectional area.

13. An improved lawn mower as recited in claim 12, wherein the bag frame includes a plurality of spaced sides which surround and define the open cross-sectional area thereof, and wherein at least one of the sides includes a pair of squeeze handles for squeezing the sides together to thereby contract the cross-sectional area of the bag frame from the first normal sized area to the second smaller sized area.

14. An improved lawn mower as recited in claim 13, wherein the framework means comprises a first bracket for releasably receiving and retaining a portion of the bag frame opposite said squeeze handles, and further includes a handle receiving bracket for receiving and retaining said handles when the bag frame has its normal sized area but which releases the handles when the handles have been squeezed together to contract the bag frame to its second smaller sized area.

* * * * *